Patented July 9, 1946

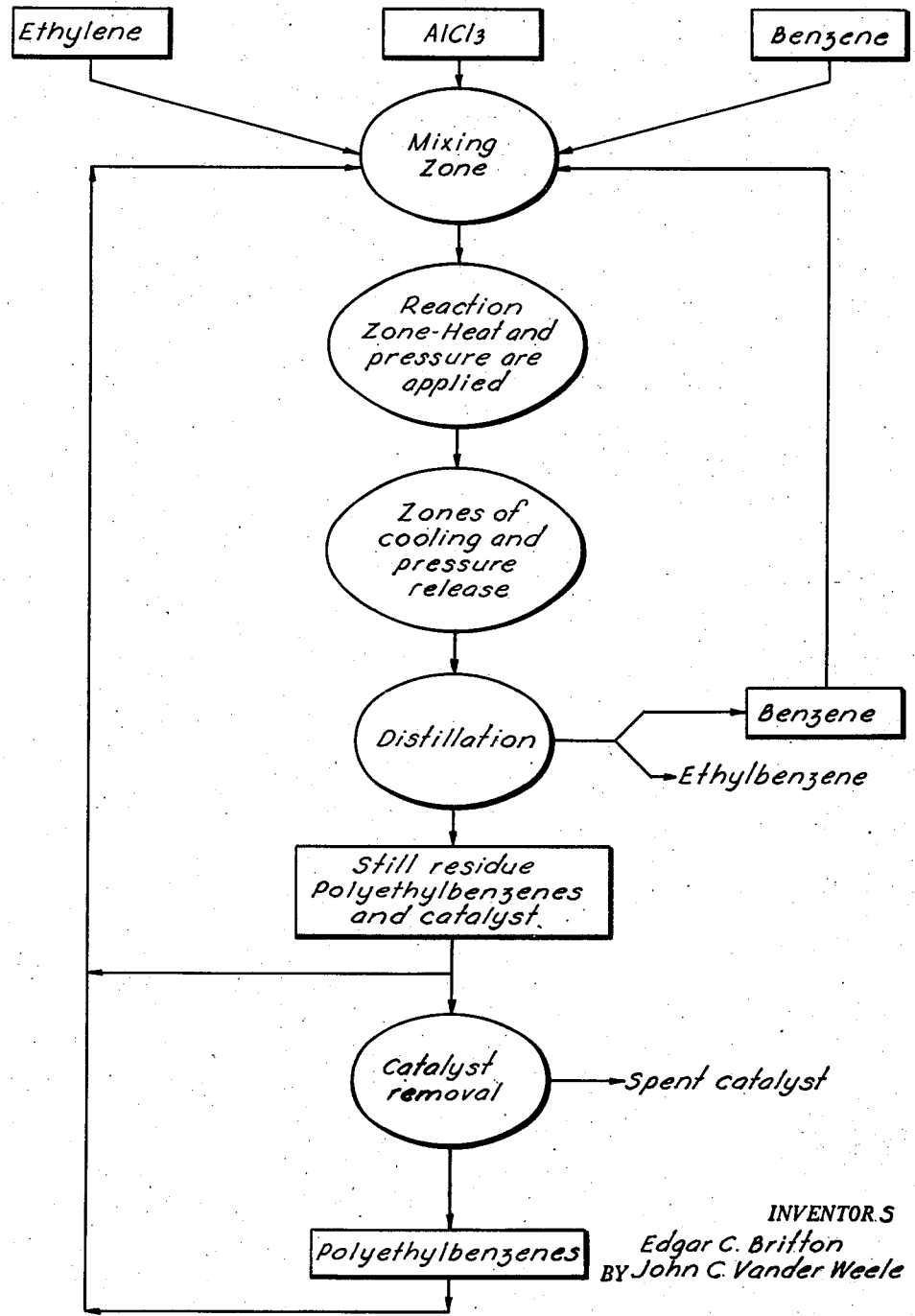

2,403,785

UNITED STATES PATENT OFFICE 2,403,785

ALKYLATION METHOD

Edgar C. Britton and John C. Vander Weele, Midland, Mich., assignors to The Dow Chemical Company, Midland, Mich., a corporation of Michigan Application October 7, 1943, Serial No. 505,352

16 Claims. (Cl. 260—671)

This invention concerns an improved method for the production of alkylated benzene derivatives by the reaction between olefines and certain aromatic hydrocarbons or halohydrocarbons in the presence of aluminum chloride. The aromatic compounds employed as reactants in the process have the general formula:

wherein X and Y each represents hydrogen, or a halogen atom, e. g. chlorine or bromine, or an alkyl radical. Such reactants, and also the alkylated reaction products, are members of the benzene series and, for convenience, may be referred to as "benzene compounds."

The reaction of olefines with benzene compounds in the presence of aluminum chloride is well known and is applied industrially in the manufacture of ethylbenzene. The reaction to produce ethylbenzene is usually carried out at atmospheric pressure or thereabout and at temperatures between 50° and 80° C. in the presence of a minor, but appreciable, amount of aluminum chloride as catalyst. The aluminum chloride is employed in a concentration corresponding to two per cent or more of the weight of the benzene reactant, i. e. in amount corresponding to at least 0.01 molecular equivalent of $AlCl_3$ per mole of benzene, since smaller proportions are ineffectual under such usual reaction conditions. Although other reaction temperatures and pressures have in certain instances been tested, the aluminum chloride catalyst has, insofar as we are aware, always been used in concentrations as high as those just mentioned. Usually, a small amount of hydrogen chloride, or a compound capable of forming the same in situ in the reaction mixture, is also added as a catalyst promotor.

During use in the reaction, the aluminum chloride forms an addition compound with other ingredients of the mixture. The addition compound, variously known as a "complex catalyst," a "catalyst complex," or as a "catalyst sludge," possesses a high catalytic activity, but is only sparingly soluble in the reaction mixture. Accordingly, in usual practice, the mixture is stirred or otherwise agitated during the reaction and is subsequently permitted to settle into a lower layer of the complex catalyst and an upper layer of the alkylated aromatic products. The upper layer is separated and treated to remove the small amount of dissolved catalyst, after which it is fractionally distilled to separate the products. The catalyst layer of the reaction mixture may be reemployed in the alkylation reaction, but after being recycled a number of times, it loses its activity and is discarded.

A plurality of alkylated aromatic products, e. g. a mixture of mono-ethylbenzene and polyethylbenzenes, is formed in the reaction. When a mono-alkyl aromatic compound is desired as the product, the aromatic reactant is used in molecular excess over the olefine in order that the formation of such product may be favored. However, even when using the aromatic reactant in excess, polyalkylated products are formed in considerable amount. For instance, in the manufacture of ethylbenzene, although from 2 to 6 molecular equivalents of benzene are usually employed per mole of ethylene, the yield of ethylbenzene seldom, if ever, exceeds 65 per cent of theoretical and polyethylbenzenes are formed in considerable amount. The polyethylbenzenes may be "cut back" to ethylbenzene by being reacted with benzene in the presence of aluminum chloride, but this involves extra operations. It is desirable that the proportion of the products which need be cut back be as small as possible.

In a continuous process for the manufacture of ethylbenzene under the usual operating conditions just described, large and expensive reactors are required in order to provide ample time for the alkylation reaction while producing the product in the amounts required and also in order to "cut back" to ethylbenzene the considerable amounts of polyethylbenzenes which are formed. Also, although the proportion of catalyst present in the alkylation mixture at any instant may be quite small, the total amount of aluminum chloride consumed per year is large. For purpose of economy, and in order to conserve on aluminum chloride which, at present, is available in restricted amounts, a method whereby the reaction may be carried out with smaller amounts of the catalyst is desired.

It is an object of this invention to provide an improved method of alkylating hydrocarbons or halohydrocarbons of the benzene series with olefines, whereby the proportion of catalyst required for the reaction may be reduced below that heretofore considered necessary and whereby the reaction may be carried out rapidly and continuously in apparatus of simple construction. Another object is to provide such method whereby a monoalkyl aromatic compound may be produced directly in unusually high yield, relative to the polyalkylated products. A further object is to provide such method whereby the alkylation reaction may be carried out smoothly, rapidly and in continuous manner using apparatus of simple construction, e. g. a tubular autoclave. Other objects will be apparent from the following description of the invention.

We have found that by carrying out the reaction between an olefine and a benzene compound, i. e. a hydrocarbon or nuclear halogenated hydrocarbon of the benzene series, at temperatures above 90° C. and under a pressure sufficient to liquefy the mixture, the proportion of catalyst required for the reaction may be reduced greatly. We have further found that when a mixture of an olefine and a molecular excess of an aromatic hydrocarbon is reacted under such conditions, a monoalkylated aromatic compound is formed in higher yield, relative to the polyalkylated products, than when the reaction is carried out under the hereinbefore mentioned usual reaction conditions.

The reaction between an olefine and a benzene compound may be carried out batchwise, but is advantageously carried out in continuous manner. Similar reaction temperatures and proportions of the reactants and catalyst are employed regardless of which procedure is followed.

The accompanying drawing is a flow sheet which indicates a preferred sequence of steps when applying the invention for the manufacture of ethylbenzene in continuous manner.

In manufacturing ethylbenzene in continuous manner, ethylene and benzene are passed under pressure into admixture with one another at relative rates of flow such that the mixture contains a molecular excess, e. g. from 2–6 molecular equivalents, of benzene per mole of the ethylene. Prior to or after admixing the reactants, aluminum chloride is added in amount corresponding to less than 1.2, e. g. from 0.3 to 1.0 and preferably from 0.3 to 0.7, per cent of the weight of the benzene reactant. In other words, less than 0.007, e. g. from 0.00175 to 0.00584, and preferably from 0.00175 to 0.00437, molecular equivalent of aluminum chloride (on a basis of the formula $AlCl_3$) is employed per mole of the aromatic reactant. The aluminum chloride is advantageously added by passing the benzene reactant, or the reaction mixture, through a bed of granular aluminum chloride at the rate necessary to dissolve the required amount of catalyst. In practice, the aluminum chloride is usually dissolved by warming the benzene, e. g. to from 30° to 50° C., and passing it through such bed prior to admixing the ethylene therewith.

The reactants and the catalyst are preferably employed in as nearly anhydrous condition as possible. However, a minor amount of moisture, e. g. an amount corresponding to one or two per cent of the weight of the dissolved aluminum chloride, may be tolerated. It should be mentioned that in Friedel-Crafts reactions between olefines and aromatic hydrocarbons, it has heretofore been usual practice to add a small amount of hydrogen chloride or an alkyl chloride as a catalyst promotor and such "promotor" may, if desired, be added in practice of this invention. However, the alkylation reaction occurs satisfactorily under the reaction conditions herein disclosed in the absence of such added promotor and the latter may be omitted.

The mixture of ethylene, benzene and the catalyst is passed at a liquefying pressure, i. e. a pressure sufficient to maintain the same in liquid form, through a tubular autoclave or other reactor where it is heated to a reaction temperature of at least 90° C. and preferably from 100 to 200° C. Somewhat higher temperatures, e. g. 220° C., may sometimes be used, but are not recommended. Under such preferred conditions, the alkylation reaction occurs rapidly and is usually complete in from 5 to 15 minutes. The rate of flow through the reactor is preferably such as to permit substantially complete consumption of the olefine reactant. The reaction is carried out at a pressure of at least 300 pounds per square inch, gauge, preferably from 600 to 1200 pounds per square inch or higher, when using ethylene as a reactant. In similar reactions involving the use of propylene or higher olefines, instead of ethylene, lower pressures, in some instances as low as 50 pounds per square inch, may be employed. In any instance, the pressure should be sufficient to maintain the reaction mixture largely in liquefied form so that the major part, and preferably all, of the olefin is dissolved in the aromatic reactant. The reactor employed is preferably constructed of, or lined with, a substance resistant to corrosion by acids. An autoclave lined with nickel, a stainless steel, or glass, or constructed of one of said metals may be used.

The mixture flowing from the reaction zone is cooled, e. g. to below 50° C., and is passed through a valve for releasing the pressure. The ethylated benzene products may be distilled directly from the reacted mixture and the residual catalyst be returned to the reaction, or the catalyst may first be removed in any of the usual ways, e. g. mechanically, when a portion of the catalyst separates as a distinct layer, or by washing with water or an aqueous alkali solution, or by adding ammonia to form a precipitate, etc., and the ethylated benzene products may thereafter be separated by distillation. Usually the products are recovered in somewhat higher yields when the catalyst is removed before distilling the products. The distillation is ordinarily carried out in such manner as to separate the ethylbenzene from polyethylbenzenes, e. g. diethylbenzene and triethylbenzene. By operating as just described, ethylbenzene may be produced directly in a yield of 80 per cent of theoretical or higher, based on the ethylene employed. Also, 80 molecular equivalents or more of ethylene may be reacted per mole of the aluminum chloride catalyst.

The yield may be further improved by reacting the polyethylbenzenes with benzene in the presence of aluminum chloride to form an added amount of ethylbenzene. The procedure for carrying out such dealkylation reaction is well known and need not be given in detail. Instead of carrying out the dealkylation reaction separately from the alkylation reaction, the polyethylbenzenes may be returned to the alkylation reaction where they serve to suppress the further formation of polyethylbenzenes and to direct the reaction to the formation of ethylbenzene in increased yield.

The process may, if desired, be modified in other ways. For instance, in place of fresh aluminum chloride, the complex catalyst sludge from a prior Friedel-Crafts reaction may be used as such, or in admixture with fresh aluminum chloride, to catalyze the reaction. Such catalyst sludge is, of course, less active than aluminum chloride itself and the latter is most conveniently employed. However, when operating in the foregoing continuous manner, the reaction liquor while hot, e. g. at 100–200° C., may be caused to flow from the tubular reactor through a valve for releasing the pressure and into a retort, or still, where the benzene and ethylbenzene are distilled, preferably in flash manner. A considerable portion, e. g. one-half or two-thirds, of the residual mixture of polyethylbenzenes and the complex catalyst may be admixed with the ethylene and benzene reactants and a minor amount of added aluminum chloride and be returned together with such starting materials to the reaction. The remaining portion of the still residue is withdrawn from the reaction system, in order to avoid accumulating spent, i. e. deactivated, catalyst in the reaction zone, and is treated to free the polyethylbenzenes of the catalyst associated therewith. The polyethylbenzenes thus recovered may be admixed with the benzene starting material and be returned to the reaction zones. The benzene and ethylbenzene mixture obtained as the distillate in the flash distillation operation is fractionally distilled to separate the ethylbenzene product. The recovered benzene may be reemployed in the process.

For purpose of clarity, the invention has been explained with special reference to the preparation of ethylbenzene, but it may be applied in producing other alkylated benzene compounds. For instance, by increasing the molecular ratio of ethylene to benzene over those hereinbefore recommended, a polyethylbenzene, e. g. diethylbenzene or triethylbenzene, may be produced as a principal product. Also, the method may be employed in reacting propylene with ethylbenzene to form isopropyl-ethylbenzene; in reacting propylene with benzene to form isopropylbenzene or a polyisopropylbenzene; in reacting butylene with benzene to form a butylbenzene or a polybutylbenzene; in reacting ethylene with chlorobenzene to form ethyl-chlorobenzene or diethyl-chlorobenzene; in reacting ethylene with bromobenzene to form ethyl-bromobenzene or diethyl-bromobenzene; or in reacting propylene with chlorobenzene to form isopropyl-chlorobenzene or di-isopropyl-chlorobenzene; etc. The method is particularly advantageous when employing ethylene or propylene as the olefine reactant.

The following examples describe certain ways in which the principle of the invention has been applied, but are not to be construed as limiting its scope.

*Example 1*

A stainless-steel bomb of 1.7 liters capacity was charged with 3.12 grams of granular aluminum chloride and with a solution of 5 grams of hydrogen chloride in 624 grams of substantially anhydrous benzene. Ethylene of 94 per cent purity was then passed into the bomb until the pressure inside the bomb was 300 pounds per square inch at 20° C. The bomb was then closed and heated, while rotating the same, so that the temperature was increased from 20° to 115° C. in 25 minutes and from 115° to 200° C. in 55 minutes. The bomb was maintained at 200 C. for 20 minutes, hence the total time of heating was approximately 1 hour 40 minutes. During heating the vapor pressure inside the bomb increased in the first 25-minute period from the initial pressure of 300 pounds per square inch at 20° C. to 580 pounds at 115° C. Thereafter the pressure decreased to only 180 pounds per square inch at a temperature of 200° C. at the close of the heating period. The bomb was then cooled to about room temperature and unreacted gases were vented therefrom. The gases thus vented had a volume of approximately one liter at atmospheric pressure and contained little, if any, ethylene. The reaction mixture was removed from the bomb and washed successively with water and with a dilute aqueous sodium hydroxide solution to remove the catalyst. The mixture was then fractionally distilled, whereby there were obtained 341 grams of unreacted benzene, 268 grams of ethylbenzene and 77 grams of polyethylbenzenes (largely diethylbenzene). It was found that 153 molecular equivalents of ethylene had been reacted per mole of aluminum chloride (AlCl₃) employed. The yield of ethylbenzene was 80 per cent of theoretical, based on the ethylene.

*Example 2*

A solution of 37.65 kilograms (483 moles) of benzene and 750 grams (10.6 moles) of ethyl chloride was pumped under pressure through a heating coil, where it was warmed to between 35° and 45° C., and thence through a chamber containing granular aluminum chloride. The rate of flow through said chamber was such that the liquor dissolved 134 grams of aluminum chloride, an amount corresponding to 0.36 per cent of the weight of the benzene. Ethylene of 94 per cent purity was fed, under a pressure of 600 pounds per square inch, into admixture with the liquor flowing from the above-mentioned chamber. A total of 2886 grams (103 moles) of ethylene (on a basis of the pure compound) was thus added. Since both the ethylene and the ethyl chloride are capable of reacting to ethylate benzene, the ethyl chloride may be considered as equivalent to ethylene. Accordingly, the molecular ratio of benzene to ethylene plus the ethyl chloride was 4.62. The solution of ethylene, benzene, ethyl chloride and aluminum chloride was passed under a pressure of about 600 pounds per square inch and at a rate of approximately 3.6 liters per hour through a nickel tubular autoclave of ⅜ inch internal diameter and of 600 cubic centimeters capacity while heating the autoclave in an oil bath at 200° C. The contact time, i. e. the time required for an infinitesimal portion of the reaction liquor to travel through the autoclave, was approximately 10 minutes. As the liquor flowed from the autoclave it was cooled to approximately room temperature and then passed through a valve for releasing the pressure. Approximately 141 liters of unreacted gas were vented from the reacted mixture. The amount of gas thus vented corresponded to approximately 6 per cent of the volume of the ethylene of 94 per cent purity which had been used as a starting material; hence it was evident that substantially all of the ethylene had reacted. The reaction mixture was washed successively with water and a dilute aqueous sodium hydroxide solution and fractionally distilled. There were obtained approximately 27.5 kilograms (352 moles) of unreacted benzene, 10.34 kilograms (97.5 moles) of ethylbenzene, and 1.9 kilograms of higher boiling products (largely diethylbenzene together with some triethylbenzene). The yield of ethylbenzene was 85.8 per cent of theoretical, based on the combined amount of ethylene and ethyl chloride used as starting materials. A total of 113.5 molecular equivalents of ethylene and ethyl chloride were reacted per mole of AlCl₃.

*Example 3*

Benzene was ethylated in continuous manner by procedure similar to that described in Example 2, except that no ethyl chloride or hydrogen chloride was added to the reaction mixture; in place of benzene alone, a mixture of approximately 90 per cent by weight benzene and 10 per cent diethylbenzene was used as a starting material; and the amount of aluminum chloride dissolved in the reaction mixture corresponded to 1.1 per cent of the combined weight of the benzene and the diethylbenzene used as starting materials. The molecular ratio of benzene to the ethylene consumed was approximately 2:4. The reaction was carried out at a temperature of 200° C. under a maximum pressure of about 550 pounds per square inch. The products were separated as in Example 2. The diethylbenzene recovered from the mixture was slightly less than that initially employed; hence, no diethylbenzene was formed in the reaction. The ethylated benzene products were obtained in the relative proportions of 10 molecular equivalents of ethylbenzene to one molecular equivalent of diethylbenzene to only 0.247 molecular equivalent of higher boiling material (calculated as being triethylbenzene).

*Example 4*

A stainless-steel bomb of 1.7 liters capacity was charged with a mixture of 624 grams (8 moles) of benzene, 1.1 grams of ethyl chloride and 1.6 grams (0.012 mole) of aluminum chloride. Propylene was fed into the bomb under a pressure of 60 pounds per square inch, gauge, until the mixture was saturated therewith. The bomb was closed and heated gradually, while rotating the same, to 200° C. and then cooled to room temperature. It was noted that the mixture within the bomb was at approximately atmospheric pressure, indicating that practically all of the propylene had been reacted. The bomb was opened and discharged. The reacted mixture was found to weigh 725 grams, indicating that 98.3 grams (2.34 moles) of propylene had been consumed. The mixture was washed successively with water and a dilute aqueous sodium hydroxide solution, for purpose of removing the catalyst, and fractionally distilled. There were obtained 490 grams (6.28 moles) of unreacted benzene, 172 grams (1.43 moles) of isopropylbenzene, and 63 grams of higher boiling products, largely di-isopropylbenzene. The yield of isopropylbenzene was 61 per cent of theoretical, based on the propylene. The molecular ratio of propylene consumed to aluminum chloride employed was 195.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of alkylating an aromatic compound having the general formula:

wherein X and Y each represents a member of the group consisting of hydrogen, halogens and alkyl radicals, the steps of forming a liquefied mixture of the aromatic compound, a normally gaseous olefine and aluminum chloride in amount not exceeding 0.007 of the molecular equivalent of the aromatic compound, and heating the mixture at a reaction temperature above 90° C. under a pressure sufficient to maintain it in liquefied form.

2. In a method of alkylating an aromatic compound having the general formula:

wherein X and Y each represents a member of the group consisting of hydrogen, halogens, and alkyl radicals, the steps which consist in forming a mixture of said aromatic compound, an olefine having not more than three carbon atoms in the molecule, and aluminum chloride in amount corresponding to between 0.00175 and 0.00584 of the molecular equivalent of the aromatic compound, and heating the mixture to a reaction temperature above 90° C. at a superatmospheric pressure sufficient to liquefy the mixture.

3. The method as described in claim 2, wherein the aromatic reactant is employed in molecular excess over the olefine and the reaction temperature is between about 90° and about 200° C.

4. In a continuous method for alkylating an aromatic compound having the general formula:

wherein X and Y each represents a member of the group consisting of hydrogen, halogens, and alkyl radicals, the steps of passing said aromatic compound over solid aluminum chloride at a rate such that between 0.00175 and 0.007 molecular equivalent of aluminum chloride is dissolved per mole of the aromatic compound, admixing with the resultant solution an olefine having not more than three carbon atoms in the molecule, the mixing being carried out under a pressure sufficient to liquefy the mixture, and passing the mixture through a reaction zone where it is heated to a reaction temperature above 90° C. while at a pressure sufficient to maintain the same in liquid form.

5. The method as described in claim 4, wherein the aluminum chloride is employed in a proportion corresponding to between 0.00175 and 0.00584 of the molecular equivalent of the aromatic reactant, the reaction mixture is heated to a reaction temperature between 90° and 200° C., the reaction mixture is cooled and brought to atmospheric pressure as it flows from the reaction zone, and an alkylated aromatic product is separated from the mixture.

6. The method as described in claim 4, wherein the aluminum chloride is employed in a proportion corresponding to between 0.00175 and 0.00437 of the molecular equivalent of the aromatic reactant, the latter is employed in molecular excess over the olefine, the reaction mixture is heated to a reaction temperature between 90° and 200° C. and is cooled and brought to atmospheric pressure as it flows from the heating zone, a mono-alkylated aromatic product is separated from the mixture, and polyalkylated aromatic products are recycled to the reaction zone.

7. In a continuous method of alkylating an aromatic compound having the general formula:

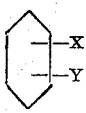

wherein X and Y each represents a member of the group consisting of hydrogen, halogens and alkyl radicals, the steps of passing said aromatic compound, together with between 0.00175 and 0.007 of its molecular equivalent of aluminum chloride, into admixture with less than 0.5 molecular equivalent of a normally gaseous olefine at a pressure such as to liquefy the resultant mixture, passing the latter through a reaction zone where it is heated to a reaction temperature between 90° and 200° C. while in liquefied form, cooling the reaction mixture and bringing it to atmospheric pressure as it flows from said zone, distilling the lower boiling alkylated aromatic product from the reaction mixture, returning a portion of the residual mixture of complex catalyst and polyalkylated products to the reaction zone, and while continuing the foregoing operations introducing aluminum chloride together with the reactants and withdrawing complex catalyst from the reaction system at rates such that the mixture in the reaction zone contains between 0.00175 and 0.007 molecular equivalent of aluminum chloride in the catalyst per mole of the aromatic compounds.

8. In a method of ethylating an aromatic compound having the general formula:

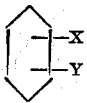

wherein X and Y each represents a member of the group consisting of hydrogen, halogens, and alkyl radicals, the steps of forming a liquefied mixture of the aromatic compound, ethylene and aluminum chloride in amount not exceeding 0.007 of the molecular equivalent of the aromatic compound, and heating the mixture at a reaction temperature above 90° C. under a pressure sufficient to maintain the mixture for the most part in liquefied form.

9. In a method of ethylating benzene, the steps of forming a liquefied mixture of ethylene, benzene, and aluminum chloride in amount corresponding to between 0.3 and 1.2 per cent of the weight of the benzene, heating the mixture to a reaction temperature between 90° and 200° C. while at a pressure sufficient to maintain the same largely in liquefied form, and thereafter cooling the mixture, releasing the pressure, and separating an ethylated benzene product therefrom.

10. In a method of making ethylbenzene, the steps of forming a liquefied mixture of benzene, ethylene, and aluminum chloride in amount corresponding to between 0.3 and 1.0 per cent of the weight of the benzene, heating the mixture to a reaction temperature between 90° and 200° C. while at a pressure sufficient to maintain the same largely in liquefied form, and thereafter cooling the mixture, bringing it to atmospheric pressure and separating ethylbenzene therefrom.

11. In a continuous method of ethylating benzene, the steps of passing benzene over solid aluminum chloride at a rate such that aluminum chloride is dissolved in amount corresponding to between 0.3 and 1.2 per cent of the weight of the benzene, passing ethylene into the solution under a pressure sufficient to liquefy the mixture which is formed, passing the mixture through a heating zone where it is heated to a reaction temperature between 90° and 200° C. while under pressure sufficient to maintain the same in liquefied form, cooling the mixture and bringing it to atmospheric pressure as it flows from said heating zone, and separating an ethylated benzene compound from the mixture.

12. In a continuous method for manufacturing ethylbenzene, the steps of passing benzene over solid aluminum chloride at a rate such that aluminum chloride is dissolved in amount corresponding to between 0.3 and 0.7 per cent of the weight of the benzene, admixing ethylene with the resultant solution under a pressure sufficient to liquefy the mixture and in amount such that the mixture contains at least 2 molecular equivalents of benzene per mole the ethylene, passing the mixture through a reaction zone where it is heated to a reaction temperature between 90° and 200° C. while at a pressure sufficient to maintain the same in liquefied form, cooling the mixture and bringing it to atmospheric pressure while flowing from said reaction zone, and thereafter separating ethylbenzene from the mixture.

13. A method, as described in claim 12, wherein a polyethylbenzene product is admixed with ethylene and benzene and returned to the reaction zone.

14. A method, as described in claim 12 wherein the polyethylbenzene products are admixed with ethylene and benzene and returned to the reaction zone.

15. In a continuous method of ethylating benzene, the steps of admixing ethylene, benzene and aluminum chloride in relative proportions such that the mixture contains at least two molecular equivalents of benzene per mole of the ethylene and contains the aluminum chloride in amount corresponding to between 0.3 and 1.0 per cent of the weight of the benzene, applying to the mixture sufficient pressure to liquefy the same, passing the mixture at such pressure through a reaction zone where it is heated to a reaction temperature between 100° and 200° C., cooling and releasing the pressure on the mixture flowing from the reaction zone, distilling ethylbenzene from the reacted mixture, and returning a portion of the residual mixture of polyethylbenzenes and complex catalyst to the reaction zone together with the benzene and ethylene reactants and sufficient added aluminum chloride so that the mixture within the reaction zone contains between 0.00175 and 0.00584 molecular equivalent of aluminum chloride in the catalyst per mole of the aromatic compounds.

16. A method as described in claim 15, wherein the hot reaction mixture flowing from the reaction mixture is passed into a zone of lower pressure so as to distill benzene and ethylbenzene therefrom.

EDGAR C. BRITTON.
JOHN C. VANDER WEELE.